United States Patent
Gunasekar (12) 
(10) Patent No.: US 6,314,176 B1
(45) Date of Patent: Nov. 6, 2001

(54) THIRD PARTY CALL CONTROL

(75) Inventor: Duraisamy Gunasekar, Cedar Rapids, IA (US)

(73) Assignee: MCI WorldCom, Inc., Washington, DC (US)

( * ) Notice: Subject to any disclaimer, the term of this patent is extended or adjusted under 35 U.S.C. 154(b) by 0 days.

(21) Appl. No.: 09/404,231

(22) Filed: Sep. 23, 1999

(51) Int. Cl.[7] .................................................. H04M 3/00
(52) U.S. Cl. .................. 379/265.01; 379/219; 379/223; 379/201.01
(58) Field of Search .................................... 379/201, 219, 379/221, 222, 223, 229, 900, 265

(56) References Cited

U.S. PATENT DOCUMENTS

| | | | |
|---|---|---|---|
| 5,539,884 | * 7/1996 | RoBrock, II | 370/399 X |
| 5,703,935 | * 12/1997 | Raissyan et al. | 379/127 X |
| 5,867,495 | * 2/1999 | Elliott et al. | 370/352 |
| 5,940,472 | * 8/1999 | Newman et al. | 379/32 X |
| 5,953,406 | * 9/1999 | LaRue et al. | 379/201 X |
| 5,987,118 | * 11/1999 | Dickerman et al. | 379/207 X |

* cited by examiner

*Primary Examiner*—Creighton Smith (57) ABSTRACT

An approach for processing a call from a calling party to a called party in which the called party requires operator assistance is disclosed. A bridging switch receives a call offer from the calling party and forwards the call offer to an automatic call distributor (ACD). The ACD selectively distributes the call offer to a local operator, instructing the local operator to establish the call with the called party. The local operator, such as an audio response unit (ARU), establishes the call. A remote operator collaboratively communicates with the ARU over a packet switched network to control call processing.

30 Claims, 7 Drawing Sheets

THIRD PARTY CALL CONTROL

BACKGROUND OF THE INVENTION

1. Field of the Invention

The present invention relates to a telecommunication system, and is more particularly related to a call processing in a network that provides operator services.

2. Discussion of the Background

The capability to call collect has proved vital in numerous situations where the calling party does not immediately have the ability to pay for the call or the ability to direct the accompanying charges to a pre-established account. For example, a caller (calling party), who is on travel without a means to pay for a call would need to resort to placing a collect call. In this scenario, the calling party simply can use any phone, including a pay phone, to contact a family member or friend; if the call is of an urgent nature, the called party would gladly accept the charges. From the called party's view, the call is identified as a collect call by the intervention of a telephone operator, who typically would state the calling party's name and ask whether the called party would accept the call. The call is completed upon acceptance of the changes by the called party. This acceptance process becomes complicated if the called party does not speak the same language as the telephone operator. Accordingly, a telephone operator who is fluent in the language of the called party is required to assist with call completion.

Figure 9:
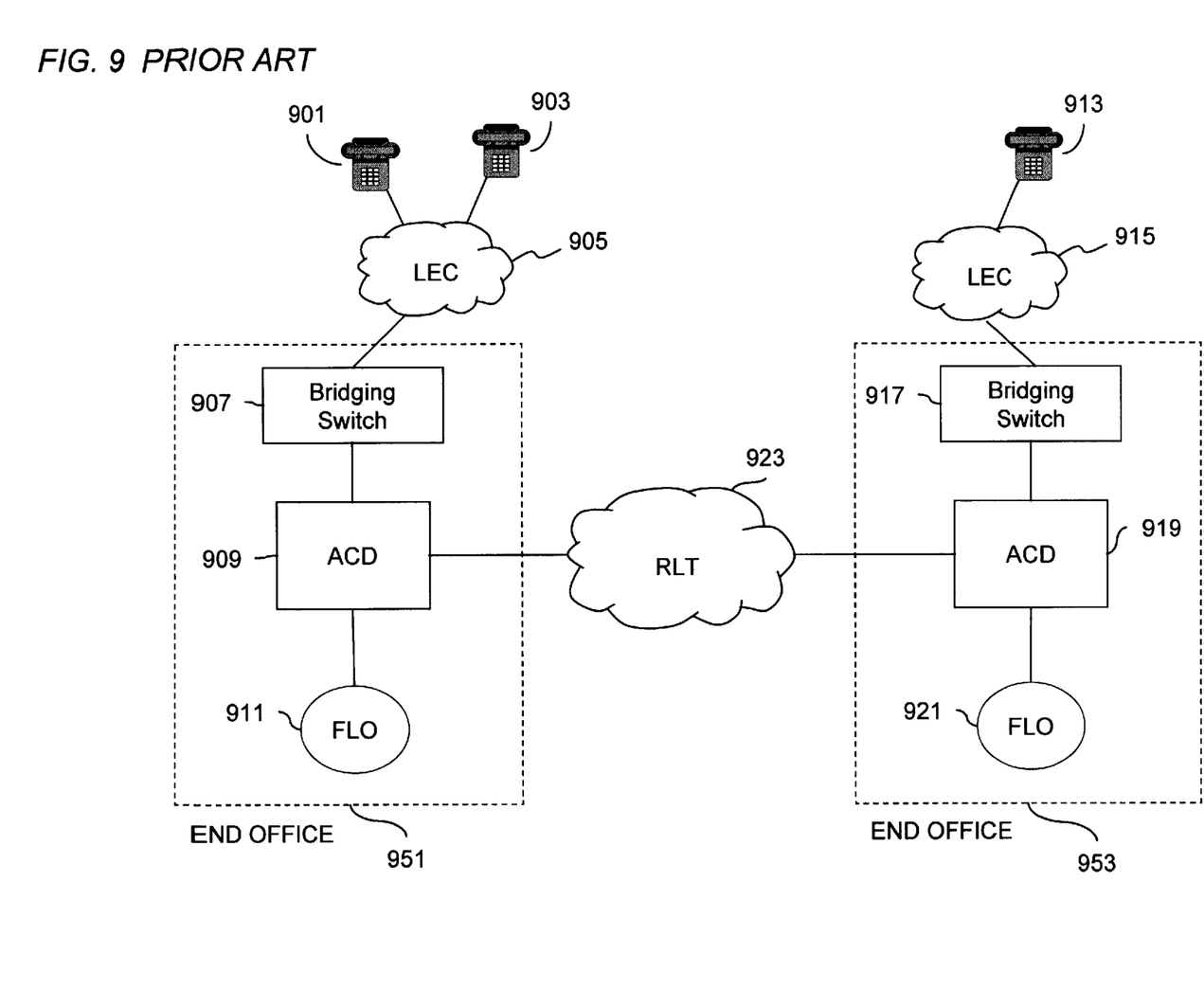
FIG. 9 is a diagram of a conventional communication system for processing a collect call.

To address this need, service providers utilize foreign language operators (FLOs) throughout the telephone network. A conventional system that employs FLOs for processing collect calls is illustrated in FIG. 9. For purposes of explanation, it is assumed that user 901, as the calling party, places a collect call to user 903, the called party via the network of a local exchange carrier (LEC) 905. As seen in FIG. 9, end office 951 has a bridging switch 907, which is connected to LEC 905. The bridging switch 907 bridges the call from user 901 to an automatic call distributor (ACD) 909. Generally, ACDs distribute incoming calls to various agents for further call processing. In this instance, the ACD 909 determines that the call from user 901 is a collect call and that the called party 903 does not speak English. Through a series of voice prompts, the ACD 909 directs the call to a foreign language operator (FLO) 911, who can then speak with called party 903 to determine whether the collect call will be accepted.

Assuming now that user 901 places a collect call to user 913, which is served by LEC 915. Bridging switch 917 within end office 953. Similar to end office 951, end office 953 has an ACD 919 that communicates with a local FLO 921 to assist with the collect call. ACD 919 communicates with ACD 909 over a release link trunk (RLT) network 923. Under this arrangement, no mechanism exists for transferring the connection to the called party 913 to a remote FLO 911; a method only exists for the transfer of a calling party. As a result, both end offices 951 and 953 require their own FLOs 911 and 921, respectively. However, requiring a FLO at every end office is not cost effective in that certain end offices will under utilize their respective FLOs; such is the case if the subscribers within a serving area of an end office are English speakers, thereby not requiring a foreign language operator.

Based on the foregoing, there is a clear need for improved approaches for call processing with respect to use of operators.

There is a further need to minimize the cost of network operation.

Based on the need to efficiently employ network resources, an approach for sharing foreign language operators is highly desirable.

SUMMARY OF THE INVENTION

According to one aspect of the invention, a method is provided for processing a call between a calling party and a called party. The method comprises receiving a call offer from the calling party. The method also includes selectively distributing the call offer via an automatic call distributor (ACD) to a local operator. The local operator is instructed to establish the call with the called party. The method further comprises instructing the local operator is to establish the call with the called party, and establishing the call with the called party in response to the instruction. The method includes establishing communication between the local operator and a remote operator over a packet switched network. Additionally, the method includes communicating with the called party to determine treatment of the call, and in response, exchanging control messages between the remote operator and the local operator. The method further includes controlling call processing of the call based upon the exchanged messages. Under this approach, under utilized network resources are eliminated, resulting in reduction of cost.

According to another aspect of the invention, a communication system for processing a call between a calling party and a called party comprises a bridging switch that is configured to switch a call offer from the calling party. An automatic call distributor (ACD) is coupled to the bridging switch and is configured to distribute selectively the call offer received from the bridging switch. A local operator is configured to receive the call offer from the ACD and to establish the call with the called party in response to an instruction by the calling party. A remote operator exchanges control messages with the local operator over a packet switched network to control call processing of the call in response to an input by the called party. The remote operator instructs the local operator to complete the call based upon the input. The above arrangement advantageously provides efficient processing of collect calls.

In yet another aspect of the invention, a communication system for processing a collect call comprises a first bridging switch that is configured to receive the call offer from a first customer premises equipment (CPE). The call offer requests setup of a collect call between the first CPE and a second CPE. A first automatic call distributor (ACD) is coupled to the first bridging switch and is also configured to distribute selectively the call offer received from the first bridging switch. A local operator center is configured to receive the call offer from the ACD and to establish the collect call with a called party associated with the second CPE in response to an instruction by a calling party associated with the first CPE. A first adjunct processor communicates with the ACD using a first signaling protocol and with the local operator center using a second signaling protocol, the first adjunct processor performing translation between the first signaling protocol and the second signaling protocol, and vice versa. A second ACD communicates with the first ACD over a circuit switched network. A remote operator center exchanges control messages with the local operator center over a packet switched network to control call processing. A remote operator communicates with the local operator over a packet switched network to control the call. The remote operator controls the call in response to an input by the called party, and completes the call based upon the input. Under this arrangement, end offices can advantageously share a foreign language operator.

In yet another aspect of the invention, a computer-readable medium carrying one or more sequences of one or more instructions for processing a call between a calling party and a called. The one or more sequences of one or more instructions include instructions which, when executed by one or more processors, cause the one or more processors to perform the step of establishing communication between a local operator and a remote operator over a packet switched network. Another step comprises communicating with the called party to determine treatment of the call. Another step includes exchanging control messages between the remote operator and the local operator based upon the communicating step. Another step includes controlling the call based upon the exchanging step This approach advantageously permits reduction of network operation costs.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention accomplishes third party call control by utilizing a remote operator to assist a called party with call completion. One arrangement, according to the preferred embodiment, provides operator assistance to a called party, who requires a foreign language operator (FLO) that is located remotely from the originating site to assess whether the called party wants to accept a collect call. Without needing to transfer the call from the local operator center, the remote operator controls the call over a packet switched network, such as an Internet Protocol (IP) based network, using Intelligent Network Application Programming Interface (INAPI) messages.

Although the present invention is discussed with respect to third party call control by a remote foreign language operator to complete a collect call, it should be appreciated that one of ordinary skill in the art would recognize that the present invention has applicability to operators in general as well as other types of services.

Figure 1:
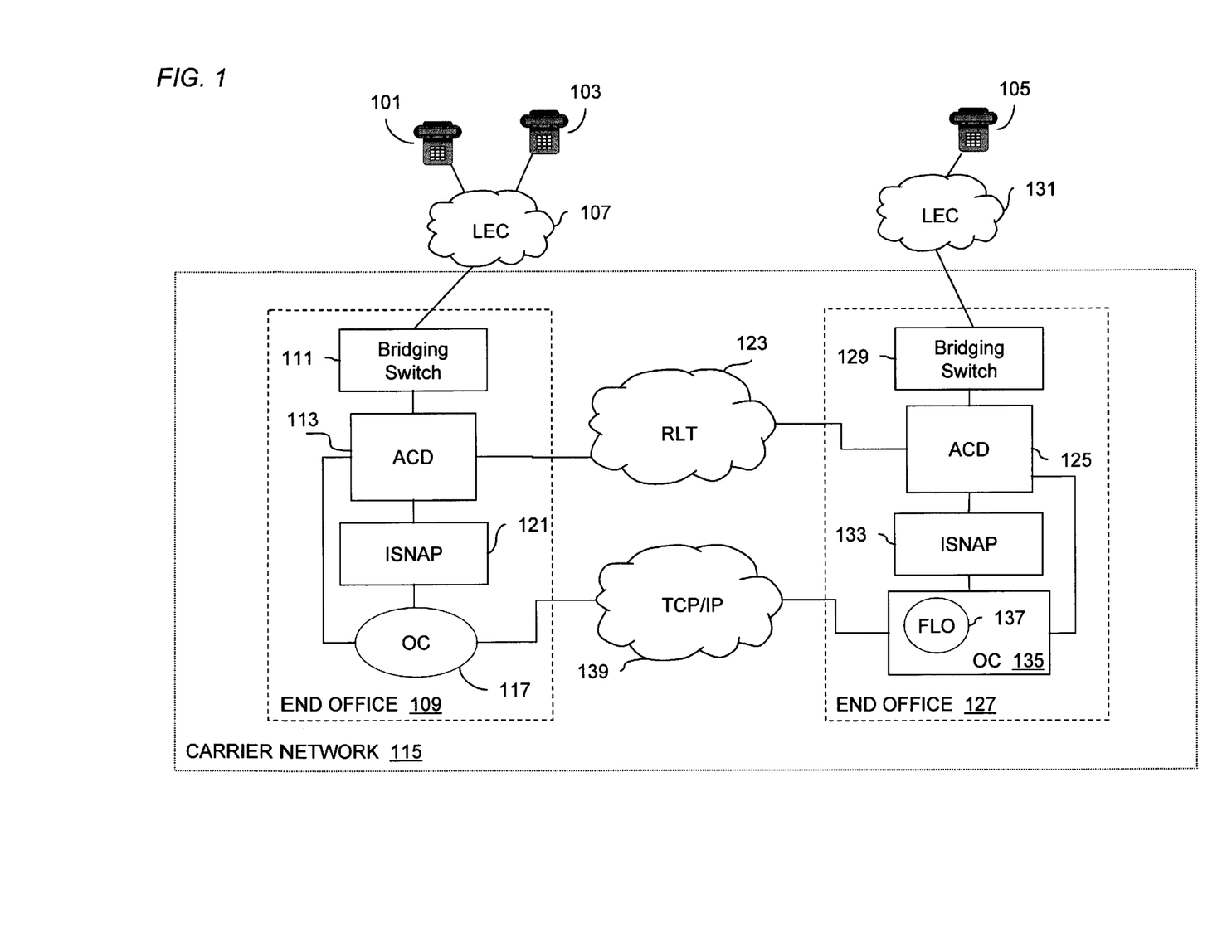
FIG. 1 is a block diagram of the architecture of the telecommunication system that provides operator services, according to an embodiment of the present invention.

FIG. 1 shows a diagram of the architecture of the call processing system in accordance to one embodiment of the present invention. Telephone users can communicate using customer premises equipment (CPE) 101, 103, and 105. The term CPE, used herein, refers broadly to terminal equipment that can initiate and receive calls; for example, telephone stations, computers, facsimile machines, interactive set-top boxes, video game systems, and etc. CPE 101 and 103 are connected to a voice network of a local exchange carrier (LEC) 107, which could be either a Regional Bell Operating Company (RBOC) or an independent telephone company that provides local telephone and related services.

LEC 107 forwards calls to an end office 109. End office 109 receives the calls from LEC 107 via a bridging switch 111. An example of a bridging switch is a DMS-250 switch manufactured by Nortel,™ Inc.; many other types of switches having similar functionalities may be employed. It is appreciated by one of ordinary skill in the art that the bridging switch, which is a standard item of telecommunications equipment, serves to accept calls from LEC 107 and to bridge them to an automatic call distributor (ACD) 113. The bridging switch 111 and the ACD 113 are interconnected via a release line trunk (RLT). ACD 113 is coupled with operator center (OC) 117 via voice channels. As will be discussed in greater detail with respect to FIG. 2, the OC 117 comprises a manual operator console (MOC) and an audio response unit (ARU). A live operator utilizes the MOC to serve the callers; the ARU performs automated operator services.

An Intelligent Services Network Adjunct Processor (ISNAP) 121 is coupled between the OC 117 and the ACD 113. The ISNAP 121 is connected to the ACD 113 via one or more switch to computer application interface (SCAI) links. The ACD 113 communicates with ISNAP 121 and delivers calls to the different manual or automated agents. The term agent is used herein to refer to an entity that participates in call processing; e.g., a live person on a manual operator console or a software process. ISNAP 121 is responsible for selecting a group or a particular agent to which the call is to be routed. The ISNAP communicates with the ACD 113 for call delivery to the different agents within the OC 117. The ISNAP 121 is also responsible for coordinating data and voice for operator-assisted calls.

The carrier network 115 includes numerous ACDs (of which only two are shown) that are connected by a RLT network 123. According to one embodiment, the components within end offices 109 and 127, along with the RLT network 123 and the TCP/IP network 139, are part of a carrier network 115. A release link trunk permits release of a call back to the switch. As shown in FIG. 1, the ACD 113 of end office 109 communicates with ACD 125 of end office 127 over the RLT network 123. ACD 125 selectively distributes calls from bridging switch 129, which receives and transmits calls to LEC 131. CPE 105 utilizes LEC 131 to process its calls. Similar to end office 109, end office 127 has an ISNAP 133 that is connect to an ACD 125 via SCAI links. End office 127, unlike end office 109, possesses an operator center 135 with a foreign language operator (FLO) 137. It should be noted that FLO 137 can be either an automated operator or a manual operator console that is controlled by a live operator.

Calls that are destined to operators that speak a foreign language are routed by the ACD 125 to a specific operator group with operators that speak the foreign language, i.e., FLO 137. Similarly, calls that are destined to a particular service that resides in a particular ARU (not shown) are routed to that particular ARU by the ACD 125. Note that in addition to selecting a particular MOC (not shown) or ARU (not shown) in conjunction with ISNAP 133, the ACD 125 typically handles queuing of incoming calls when OC 135 is busy processing other incoming calls.

According to an embodiment of the present invention, OC 135 of end office 127 is linked to a TCP/IP network 139, enabling the communication with OC 117. As will be more fully discussed later, OC 135 has the functional capability to control call processing remotely.

The above arrangement advantageously permits end office 109 to employ the services of FLO 137, thereby eliminating the need to have a FLO 137 at both end offices 109 and 127. Implementing foreign language capability at end office 109 can result in unnecessary expense if the serving area does not have ample consumers (i.e., subscribers) who speak that foreign language to justify the cost associated with maintaining this capability. However, in the present invention, FLOs can be cost effectively deployed to only those end offices that can best utilized this capability.

Figure 2:
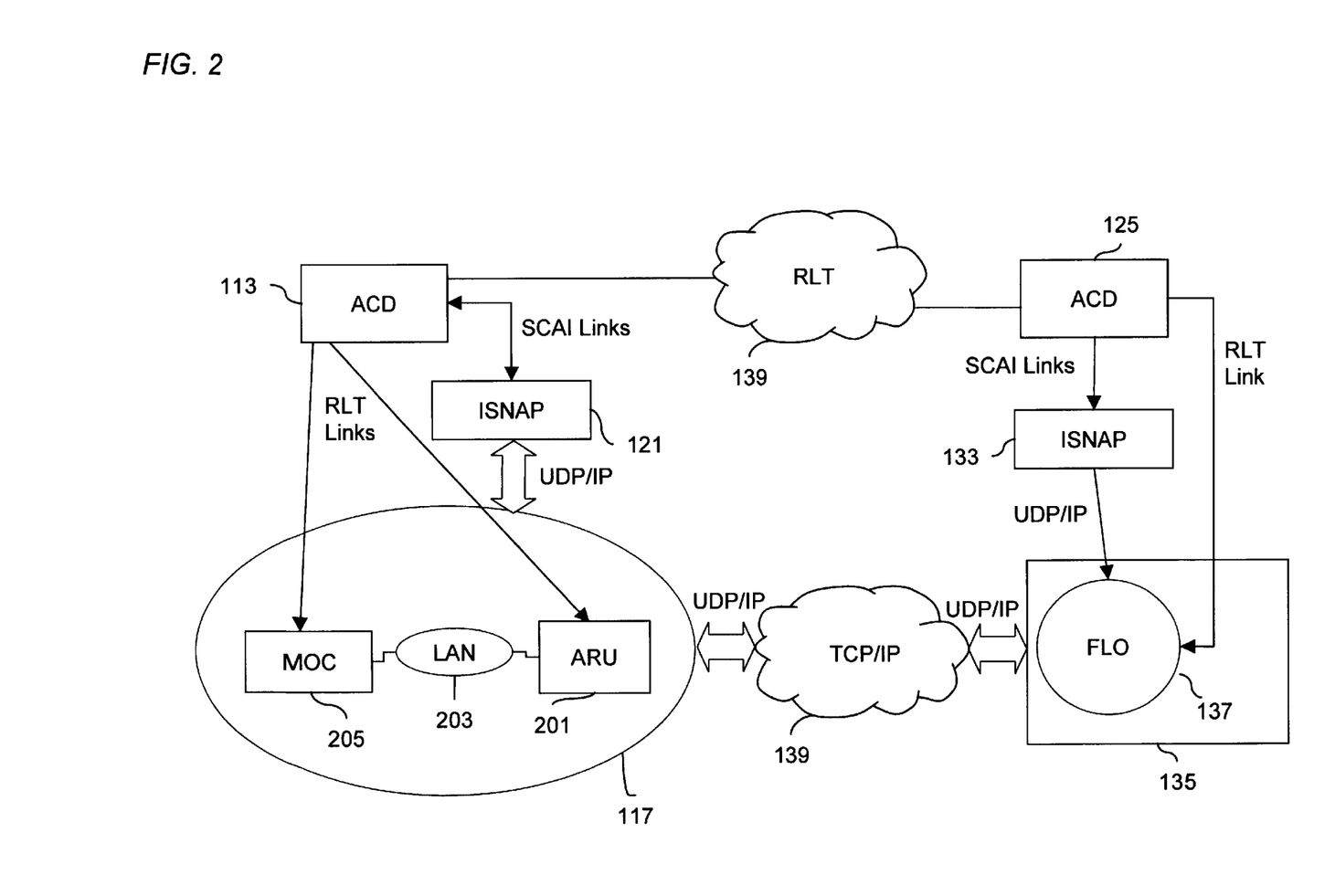
FIG. 2 is a diagram of the operator center interacting with the ACD and the adjunct processor in the system of FIG. 1.

FIG. 2 is a block diagram showing the interaction among the components of local end office 109 and the components (in particular FLO 137) of remote end office 127. The operator center (OC) 117 of end office 109 includes a manual operator console (MOC) 205 and an audio response unit (ARU) 201 to provide manual and automated operator services, respectively. The ARU 201 handles a telephone call automatically by responding to the calling party via a voice recording, which presents the calling party with prompts for inputs and with a menu from which call routings and services may be selected. The responses of the calling party may be made vocally (using automatic voice recognition), by entries from the telephone keypad, or by a combination of techniques. It is recognized by one of ordinary skill in the art that the different services offered by the OC include: validation services including call-type identification, call verification and call restrictions if any; operator services, both manual and automated, for customer assistance; database services for a variety of database look-ups; call extending capabilities; call bridging capabilities; prompt for user Input; and play voice messages.

ARU 201 of FIG. 2 is comprised of three components (not shown): a voice processor, an application interface, and an audio server. The voice processor is multi-port for voice communications via T1 lines from the ACD 113 (e.g., one T1 channel per port to serve a number of calls simultaneously). The voice processor also includes subsystems, not specifically illustrated, for voice recognition and response in multiple languages; DTMF interaction capabilities to accept and respond to inputs from a telephone keypad, for example; and voice capabilities for implementing generic and customized scripts. The audio server includes customized and generic audio scripts, and interfaces with other system components. The application interface supplies the interface between the voice response processor and the audio server. Also connected to the audio server subsystem is the voice message workstation (not shown), for the creation and recording of audio scripts. Once such audio scripts are created, they may be loaded into the audio server to be called upon for use in processing a call.

From an operational standpoint, ARU 201 performs the necessary application processing to move through the automated steps, including the provision of such things as voice prompting and menu routing, as needed. The call flow processing includes the provision of such functions as playing out digitized voice messages and tones, decoding inputs from a telephone keypad (e.g., dual tone multifrequency, or DTMF tones), digitally recording voice inputs from callers, voice recognition, and monitoring call progress.

Within the OC 117, the manual operator console 205 works concurrently with the ARU 201. That is, somecalls, which meet certain criteria, will be directed to live operators, others will be intercepted from processing by the ARU 201, and then diverted to the MOC 205. An operator at a MOC 205, if needed, is presented (e.g., via a CRT screen) with information relating to any particular call. The flow control of manually handled calls matches the automated call processing in the ARU 201 so that a transfer from automatic to manual processing can be picked up at any time without loss of continuity in handling the call.

For illustrative purposes, the OC 117 is shown with a single MOC 205 and a signal ARU 201; however, it is recognized that any number of MOCs and ARUs can be employed, depending on the traffic volume associated with end office 109. Also, it is apparent that a number of manual operator consoles can be operated simultaneously. MOCs and ARUs can be organized into operator groups depending on the type of calls received by ACD 113 from the bridging switch 111. For examples, calls in which the calling party or called party require foreign language assistance may be routed to the operator group that can properly deal with that particular language. Thus, a called party who speaks Spanish, for example, will require a Spanish operator. Also, calls that involve calling cards may be transferred to the operator group that are more knowledgeable calling card transactions. Thus, ACD 113 may distribute the received calls according to the operator group, using any number of criteria.

As indicated earlier, the transfer of calls between manual and automated call processing is performed without disruption of the continuity of the call. This capability relies on the expedient communication between MOC 205 and ARU 201. According to one embodiment of the present invention, MOC 205 and ARU 201 are connected to a common local area network (LAN) 203, so that these two components 205 and 201 can share information regarding call processing. LAN 203 may be any frame-based or cell-based network (e.g., ethernet, token ring, fiber distributed data interface (FDDI), or asynchronous transfer mode (ATM)). In one exemplary embodiment, LAN 203 is attached to a gateway, or router, (not shown), which accesses the TCP/IP network 139. Under this exemplary configuration, the MOC 205 and the ARU 201 can communicate over the TCP/IP network 139 to the remote FLO 137 using UDP (User Datagram Protocol) datagrams over IP. The IP packet exchange between the OC 117 and the FLO 137 is more fully described later, with respect to FIGS. 3–7. One of ordinary skill in the art would understand that any packet switched network can be substituted for the TCP/IP network 139.

As shown in FIG. 2, ACD 113 communicates with MOC 205 and ARU 201 via separate RLT links. ACD 113 routes calls from the bridging switch 111 (FIG. 1) to a particular MOC 205 or a particular ARU 201 (assuming more than one MOCs and ARUs exist within the OC 117). For example, in an actual network, calls that are destined to operators that speak a foreign language are routed by the ACD 113 to a specific operator group having operators that speak the foreign language. Similarly, calls that are destined to a particular service that resides in a particular ARU are routed to that particular ARU by the ACD 113. ACD 113 is also responsible for queuing of incoming calls, which are destined for OC 117.

Once a particular MOC 205 or ARU 201 is selected by the ACD 113, voice data for the call is carried over one of the voice path transmission lines (i.e., RLT links), which, for example, can be T1 lines. Signaling data between the ACD 113 and the OC 117 is routed over the SCAI links to the ISNAP 121. From there, the ISNAP 121 translates the SCAI protocol signaling data into UDP/IP (i.e., UDP datagram over IP) data. The UDP/IP data is then routed to the appropriate agent within the OC 117, according to routing information supplied by the ACD 113. Similarly, UDP/IP signaling data from the OC 117 is sent to ISNAP 121. This data is then translated by the ISNAP 121 into SCAI protocol data and routed to the ACD 113 via the SCAI links. ISNAP 121 also performs the reverse translation from SCAI protocol data to UDP/IP signaling data.

ACD 113 possesses the functional capability to communicate with all ACDs within the carrier network 115, of which only ACD 125 of end office 127 is shown. ACD 125 is connected to FLO 137 within OC 135 in two ways: (1) directly via a RLT connection, and (2) indirectly via ISNAP 133. SCAI links connect ACD 125 to ISNAP 133. ISNAP 133 is then connected to FLO 137, which is attached to the TCP/IP network 139. Among other functional capabilities, FLO 137 can maintain a connection with either the calling party 101 or the called party 103, while placing the other party on hold.

Figure 3:
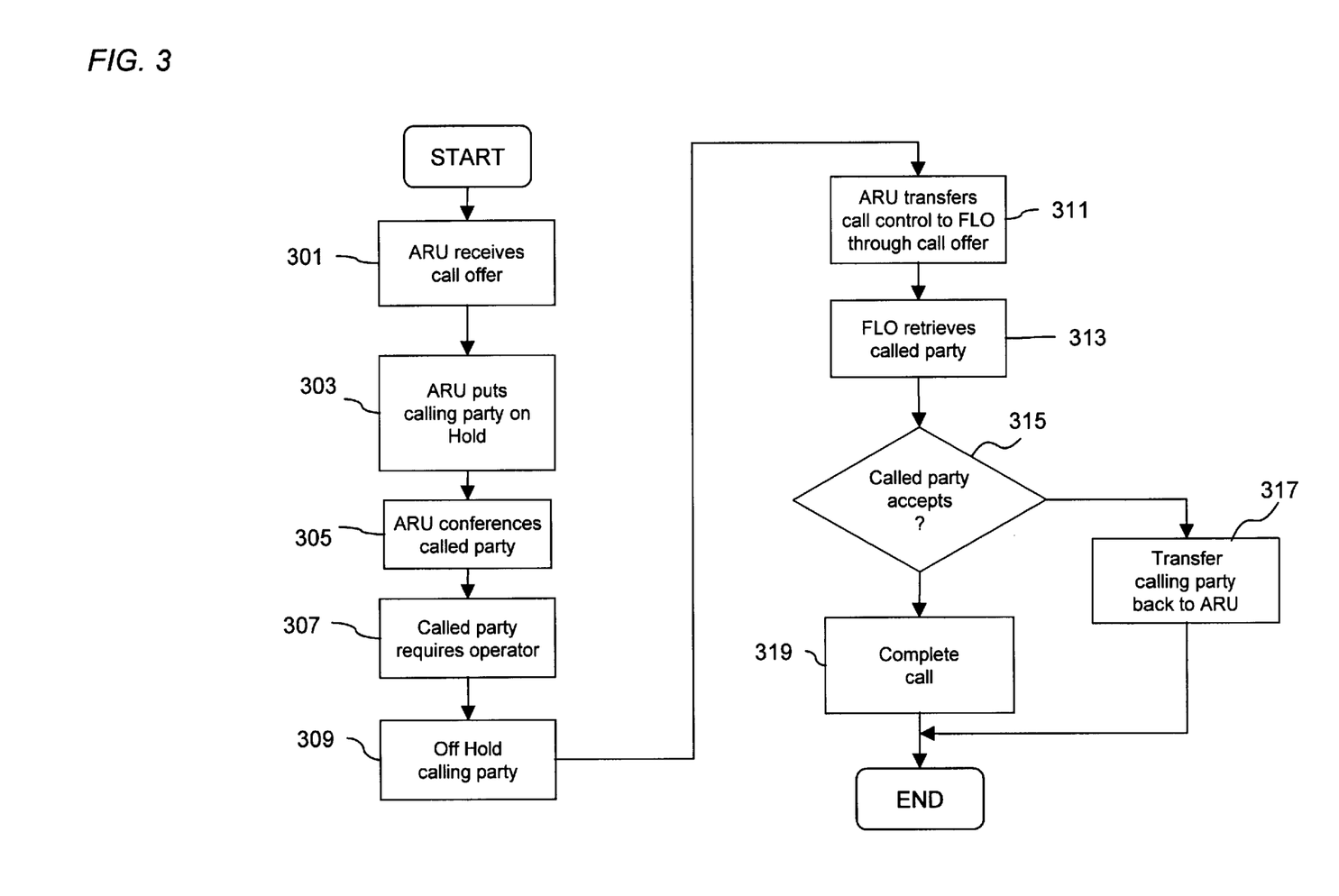
FIG. 3 is flow chart of the call setup process performed by the system of FIG. 1.

FIG. 3 is a flowchart describing the call processing operation between a calling party and a called party from the perspective of the ARU 201 and the FLO 137, in accordance with an embodiment of the present invention. In this example, calling party 101 initiates a collect call (i.e., call offer) to called party 103. The call offer is switched from LEC 107 to the bridging switch 111 of end office 109. ACD 113 receives the call offer and distributes it to ARU 201 of OC 117. In step 301, ARU 201 receives the call offer that was initiated by calling party 101; the ARU 201 provides the appropriate voice prompts to gather information from the calling party 101—e.g., the information may include the name of the calling party 101.

Next, ARU 201 puts the calling party 101 on hold, as in step 303, and establishes a call to the called party 103. Once a connection is established between the OC 117 and the called party 103, the ARU 201 conferences the called party 103 in, prompting the called party 101 to determine whether the called party 103 requires a foreign language operator (FLO) 137. OC 117 does not possess a FLO 137. It should be noted that under this scenario, the FLO 137 is remotely located from the OC 117. In step 307, the ARU 201 determines that the called party 103 requires a foreign language operator, such as FLO 137; accordingly, ARU 201 writes an appropriate transfer record and conferences in the FLO 137. ARU 201 consequently updates its IP address and port number in the transfer tecord, which is used by FLO 137 to connect through INAPI. The transfer tecord is more fully discussed later in FIG. 4.

In step 309, the calling party 101 is placed off hold by ARU 201. The ARU 201 then transfers the call offer from calling party 101 to FLO 137 (set 311). At this time, FLO 137 takes control of the call processing from OC 117, specifically, the ARU 201, without transferring the call from the ARU 201. From this point in the call process, FLO 137 remotely controls ARU 201 using INAPI (Intelligent Network Application Programming Interface) messages, which are exchanged over the TCP/IP network 139.

Next, FLO 137 retrieves the called party 103, as in step 313. Using a foreign language that is understandable by the called party 103, the FLO 137 inquires with the called party 103 whether the call offer from the calling party 101 is to be accepted (step 315). If the called party 103 answers in the affirmative, the call is completed (step 319). That is, FLO 137 issues an INAPI_RELEASE TERM (INAPI release terminal) message to the ARU 201, instructing the ARU 201 to complete the call. However, if the called party 103 declines acceptance of the call, the call is transferred back to the ARU 201, per step 317. If the called party 103 refuses to accept the charges, FLO 137 sends a denial message, TC_RELEASE TERM, to ARU 201. In addition, the ARU 201 notifies the calling party 101 that the collect call has been declined by the called party 103.

Figure 4:
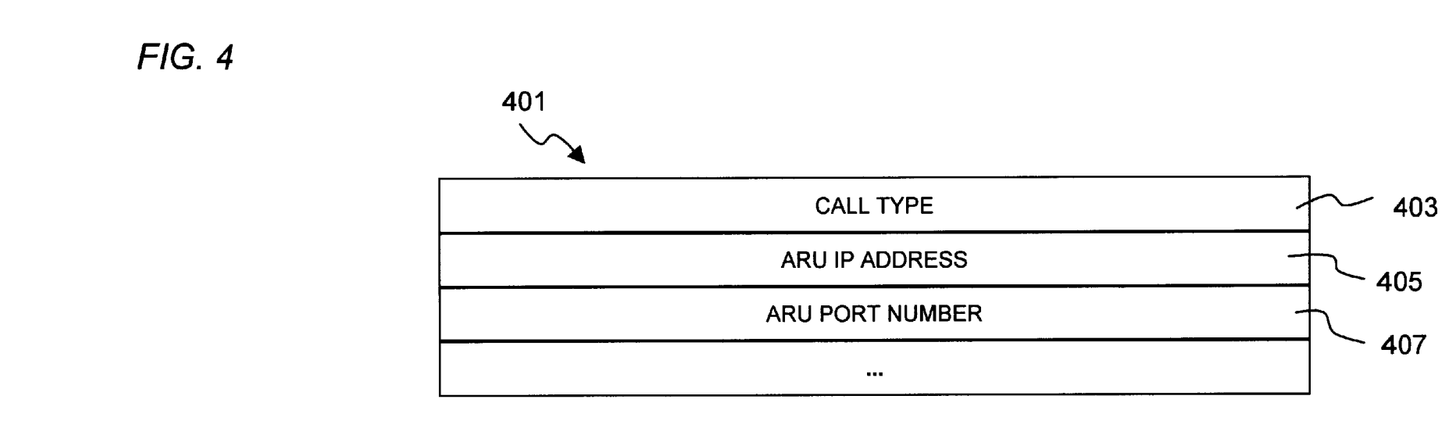
FIG. 4 is a diagram of an exemplary record structure of the transfer record that is used in the system of FIG. 1.

FIG. 4 shows an exemplary structure of the transfer record, which is contained within the call offer. As mentioned above, the transfer record 401 is written by the ARU 201 to the FLO 137 if the called party 103 requires the assistance of a foreign language operator. The transfer record 401, as shown, includes a CALL TYPE field 403, which indicates whether the call is from a calling card, a collect call, or automatic number identification (ANI) call, etc. The next field is an ARU IP ADDRESS FIELD 405; this field specifies the IP address of the ARU, which in the system of FIG. 2 is ARU 201. In addition, the transfer record structure 401 includes an ARU PORT NUMBER field 407, which indicates the particular port within the ARU 201 that the handles the call. The FLO 137 utilizes the IP address contained within the ARU IP ADDRESS FIELD 405 to connect to the ARU 201 via the TCP/IP network 139. The FLO 137 controls ARU 201 through the use of INAPI messages, which resides within the data payload of a UDP datagram. The UDP datagram format (FIG. 6) is discussed below.

Figure 5:
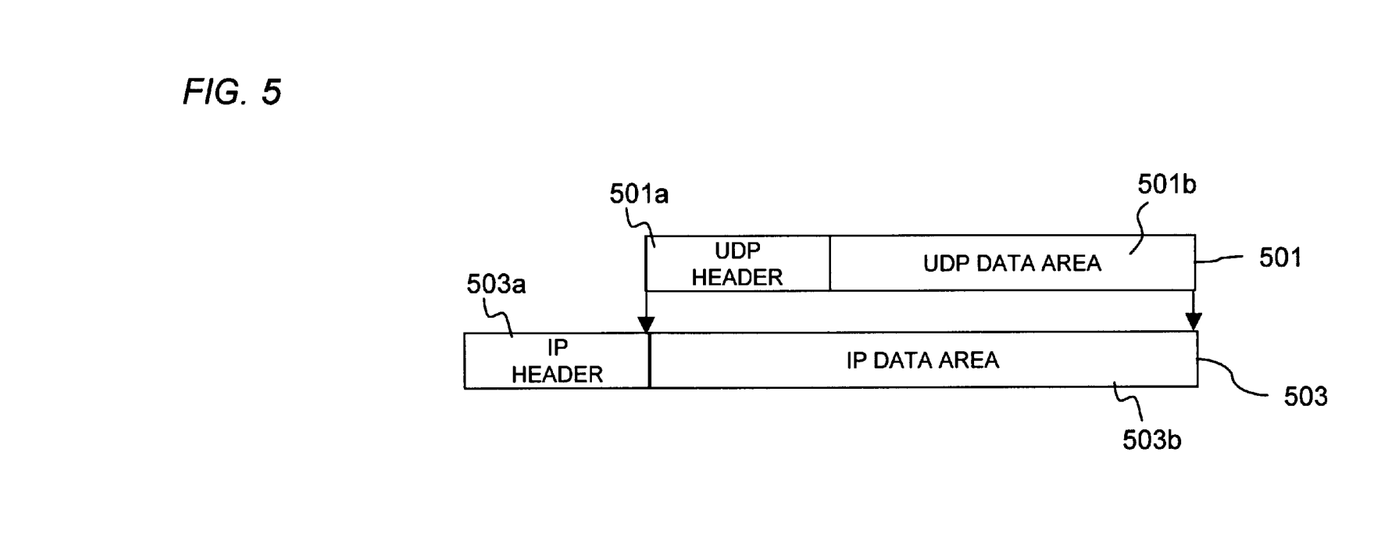
FIG. 5 is a diagram illustrating the process of encapsulating a User Datagram Protocol (UDP) datagram by an Internet Protocol (IP) packet.

Before discussing the detail formats of the UDP datagram (FIG. 6) and the IP packet (FIG. 7), it is instructive to examine the relationship of the two protocol formats. As shown in FIG. 5, a UDP datagram 501 in general includes a UDP header 501a and a UDP data area 501b. It is within this UDP data area 501b that the INAPI messages are stored for transport by the FLO 137 to the ARU 201 via the TCP/IP network 139. The UDP datagram format is further described in FIG. 6. According to an embodiment of the present invention, the UDP datagram 501 in turn is encapsulated in an IP packet 503. Specifically, the UDP datagram 501 is placed in the IP data area 503b of the IP packet 503, which also has an IP header section 503a. The format of the IP packet 503 is detailed in FIG. 7.

Figure 6:
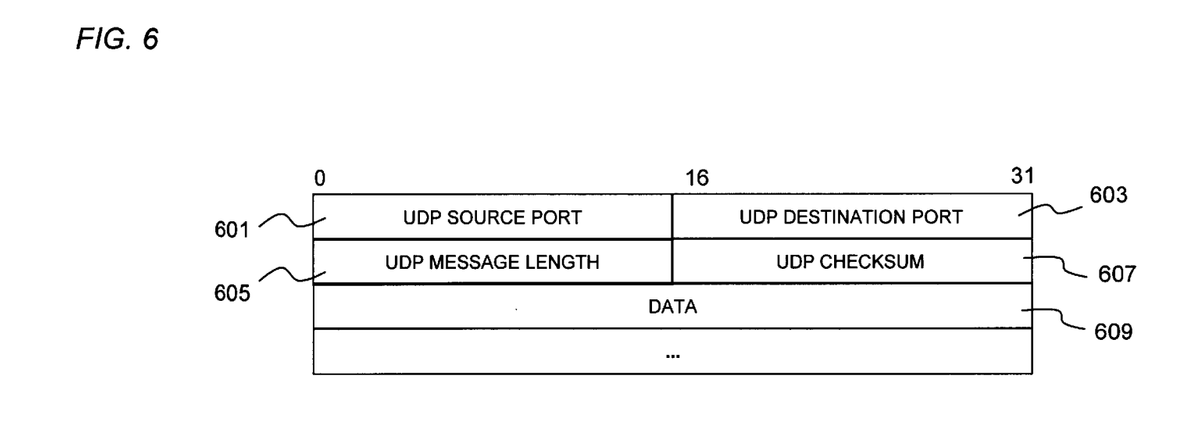
FIG. 6 is a diagram showing the format of a UDP datagram.

FIG. 6 shows the structure of a UDP datagram. The UDP datagram has a 16-bit UPD SOURCE PORT field 601 (which is an optional field) as well as a 16-bit UDP DESTINATION PORT field 603. These two fields 601 and 603 refer to the protocol port numbers, which correspond to various applications within the ARU 201. The UDP MESSAGE LENGTH field 605 specifies the total length of the UDP datagram, including the header and the data area, in octets. The optional field UDP CHECKSUM 607 is a checksum of the entire datagram, thereby minimizing the probability that the INAPI message is received in error.

Figure 7:
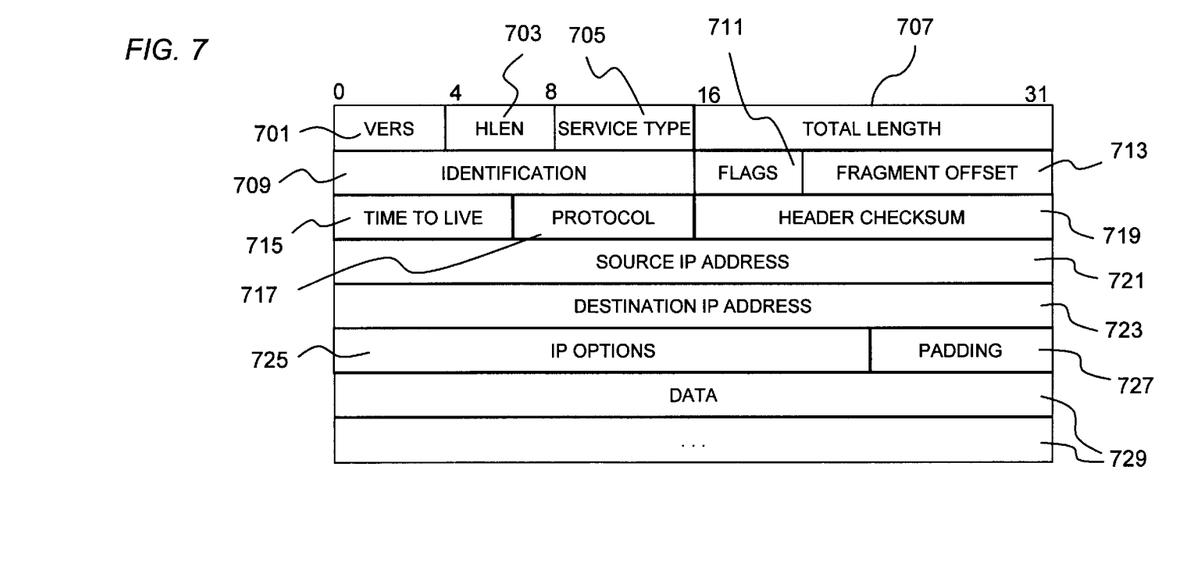
FIG. 7 is a diagram showing the format of an IP packet.

FIG. 7 illustrates an IP datagram format according to IP Version 4. Typically, IP packets are processed in software, thus the contents and format of these IP packets are not constrained by hardware implementations. As shown in FIG.

7, the first field is the VERS field 701, which is a 4-bit field that specifies the version of the IP protocol that was used by the creator of the packet. For instance, if a host (e.g., FLO 137), which is running TCP/IP, generates an IP packet, the VERS field 701 of the packet would indicate the version of the IP that is loaded on the host. This field ensures that all the devices and processes that handle this IP packet agree on the proper format of the datagram or packet. Consequently, the IP software that reside on the FLO 137 and the ARU 201 are not mismatched as to result in misinterpretation of information. If the versions do not coincide, then the packet is rejected. As previously indicated, the IP packet shown in a Version 4 IP packet. It is understood that the present invention is not limited by the version of the IP packet; for example, the present invention is applicable to IP Version 6 (IP v6).

The next field in the IP packet is the header length field (HLEN) 703, which as the name suggests, specifies the length of the packet header measured in 32-bit words. The 8-bit SERVICE TYPE field 705 specifies how the packet should be handled. In particular, the SERVICE TYPE field 705 supports prioritization levels, enabling the source host to indicate the importance of each packet; for example, the source host can request low delay, high throughput, or high reliability. It should be noted that although the source host (e.g., FLO 137) can provide a means to request these services, there are no guarantees that the desired service can be honored.

Another field of the IP packet is the TOTAL LENGTH field 707. This 16-bit field indicates the length of the entire IP packet, including header and data, measured in octets. Hence, the maximum possible size of an IP packet is $2^{16}$ octets. The IDENTIFICATION FIELD 709 is a 16-bit field that uniquely identifies the IP packet so that the destination host can identify which fragments belong to which IP packets. The 3-bit FLAGS field 711 controls fragmentation in that a bit is set depending on whether the packet should be fragmented. However, if a router (or gateway) requires that the datagram be fragmented due to a limit on its maximum transfer unit (MTU), the gateway simply discards the packet and sends an error message back to the source host. The FRAGMENT OFFSET field 713 indicates the offset in units of 8 octets from the original packet. This field is necessary to reassemble the packet from the fragments in the event that the fragments do not arrive in order.

The TIME TO LIVE field 715 specifies the duration (in seconds) of the packet's existence in the Internet. That is, a source host specifies the maximum time the packet should circulate in the TCP/IP network 139 before it is discarded. The TIME TO LIVE field 715 is decremented by any host or node that processes the packet. If a node within the TCP/IP network 139 receives a packet with a TIME TO LIVE field 715 of 0, it simply discards the packet and sends an error message back to the source host. The next field in the IP packet format is the PROTOCOL field 717. This field indicates the high level protocol used to create the message that is being carried in the data portion of the packet. The HEADER CHECKSUM field 719 apply only to the header of the IP packet, ensuring that there are no errors in the header.

The next two fields, SOURCE IP ADDRESS 721 and DESTINATION IP ADDRESS 723, house the 32-bit IP addresses of the source host and the destination host, respectively. Because of the tremendous growth of the Internet, IP addresses are quickly being exhausted. Hence, IP v6 specifies a 128-bit address field for the next generation Internet. The IP OPTIONS field 725, which is a variable length field, supports network testing or debugging. Because the IP OPTIONS field 725 is variable length, a PADDING field 727 is required to fully populate 32 bits. The remaining fields are DATA fields 729, which contain protocol data units (PDUs) of the higher layer protocols.

Although the present invention contemplates use of UDP/IP packets to transfer INAPI messages from FLO 137 to and from ARU 201, one of ordinary skill in the art would appreciate that any uniquely addressable protocol may be used.

In the preferred embodiment, the process shown in FIG. 3 may be implemented as one or more computer-executed instructions, processes, programs, subroutines, functions, or their equivalents. In an embodiment, ARU 201 as well as FLO 139 (which may be a console or an ARU) is a general-purpose computer of the type shown in FIG. 8 and described herein in connection with FIGS. 2 and 3. The exchange of INAPI messages to control the ARU 201, which is remote from the FLO 139 are one or more computer-executed instructions, processes, programs, subroutines, functions, or their equivalents. Further, embodiments may be implemented as discrete hardware circuitry, a plurality of computer instructions (computer software), or a combination of discrete hardware circuitry and computer instructions.

Figure 8:
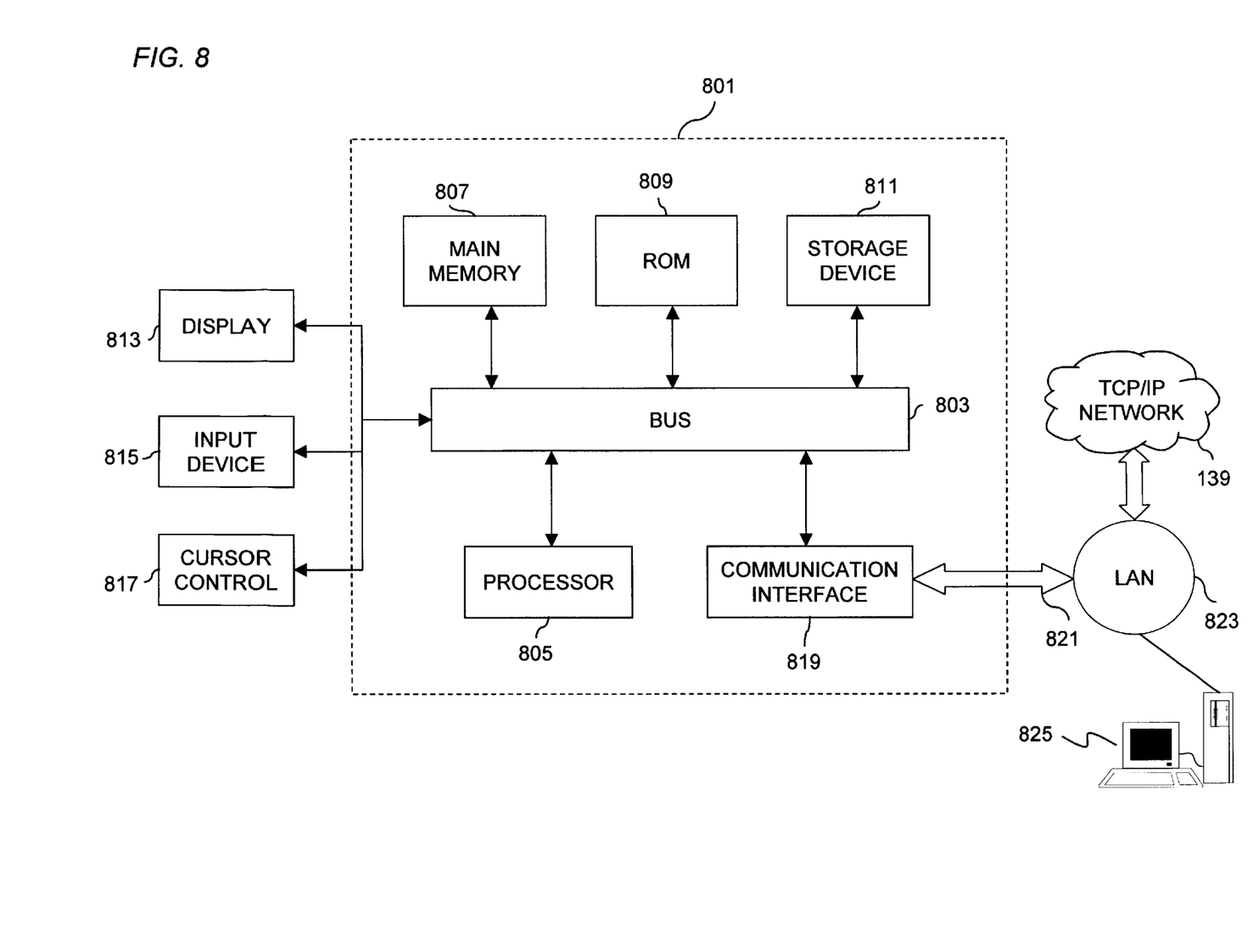
FIG. 8 is a diagram of a computer system that can perform the process of FIG. 3, in accordance with an embodiment of the present invention.

FIG. 8 illustrates a computer system 801 upon which an embodiment according to the present invention may be implemented. Computer system 801 includes a bus 803 or other communication mechanism for communicating information, and a processor 805 coupled with bus 803 for processing the information. Computer system 801 also includes a main memory 807, such as a random access memory (RAM) or other dynamic storage device, coupled to bus 803 for storing information and instructions to be executed by processor 805. In addition, main memory 807 may be used for storing temporary variables or other intermediate information during execution of instructions to be executed by processor 805. Computer system 801 further includes a read only memory (ROM) 809 or other static storage device coupled to bus 803 for storing static information and instructions for processor 805. A storage device 811, such as a magnetic disk or optical disk, is provided and coupled to bus 803 for storing information and instructions.

Computer system 801 may be coupled via bus 803 to a display 813, such as a cathode ray tube (CRT), for displaying information to a computer user. An input device 815, including alphanumeric and other keys, is coupled to bus 803 for communicating information and command selections to processor 805. Another type of user input device is cursor control 817, such as a mouse, a trackball, or cursor direction keys for communicating direction information and command selections to processor 805 and for controlling cursor movement on display 813.

Embodiments are related to the use of computer system 801 to control ARU 201 remotely via the transmission of control messages. According to one embodiment, the exchange of INAPI messages is provided by computer system 801 in response to processor 805 executing one or more sequences of one or more instructions contained in main memory 807. Such instructions may be read into main memory 807 from another computer-readable medium, such as storage device 811. Execution of the sequences of instructions contained in main memory 807 causes processor 805 to perform the process steps described herein. One or more processors in a multi-processing arrangement may also be employed to execute the sequences of instructions contained in main memory 807. In alternative embodiments, hard-wired circuitry may be used in place of or in combination with software instructions. Thus, embodiments are not limited to any specific combination of hardware circuitry and software.

Further, the INAPI messages as well as the instructions to transmit and receive such messages may reside on a computer-readable medium. The term "computer-readable medium" as used herein refers to any medium that participates in providing instructions to processor 805 for execution. Such a medium may take many forms, including but not limited to, non-volatile media, volatile media, and transmission media. Non-volatile media includes, for example, optical or magnetic disks, such as storage device 811. Volatile media includes dynamic memory, such as main memory 807. Transmission media includes coaxial cables, copper wire and fiber optics, including the wires that comprise bus 803. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 805 for execution. For example, the instructions may initially be carried on a magnetic disk of a remote computer. The remote computer can load the instructions relating to the transmission of INAPI messages to control call processing remotely into its dynamic memory and send the instructions over a telephone line using a modem. A modem local to computer system 801 can receive the data on the telephone line and use an infrared transmitter to convert the data to an infrared signal. An infrared detector coupled to bus 803 can receive the data carried in the infrared signal and place the data on bus 803. Bus 803 carries the data to main memory 807, from which processor 805 retrieves and executes the instructions. The instructions received by main memory 807 may optionally be stored on storage device 811 either before or after execution by processor 805.

Computer system 801 also includes a communication interface 819 coupled to bus 803. Communication interface 819 provides a two-way data communication coupling to a network link 821 that is connected to a local network 823. For example, communication interface 819 may be a network interface card to attach to any packet switched local area network (LAN). As another example, communication interface 819 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 819 sends and receives electrical, electromagnetic or optical signals that carry digital data streams representing various types of information.

Network link 821 typically provides data communication through one or more networks to other data devices. For example, network link 821 may provide a connection through local network 823 to a host computer 825 or to data equipment operated by a service provider, which provides data communication services through the TCP/IP network 139. LAN 823 and TCP/IP network 139 both use electrical, electromagnetic or optical signals that carry digital data streams. The signals through the various networks and the signals on network link 821 and through communication interface 819, which carry the digital data to and from computer system 801, are exemplary forms of carrier waves transporting the information. Computer system 801 can send INAPI messages and receive data, including program code, through the network(s), network link 821 and communication interface 819.

The techniques described herein provide several advantages over prior approaches to call processing in which the called party 103 requires a remote operator (e.g., foreign language operator). The present invention presents an efficient and economically feasible approach to processing collect calls involving a FLO. The FLO remotely controls a local automated operator, such as an ARU, to process calls that require foreign language operator assistance without transferring the call from the local ARU.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for processing a call between a calling party and a called party, the method comprising:

receiving a call offer from the calling party;

selectively distributing the call offer via an automatic call distributor (ACD) to a local operator;

instructing the local operator to establish the call with the called party;

establishing the call with the called party in response to the instructing step;

establishing communication between the local operator and a remote operator over a packet switched network;

communicating with the called party to determine treatment of the call;

exchanging control messages between the remote operator and the local operator based upon the communicating step; and controlling call processing of the call based upon the exchanging step.

2. A method for processing a call between a calling party and a called party, the method comprising:

receiving a call offer from the calling party;

selectively distributing the call offer via an automatic call distributor (ACD) to a local operator;

instructing the local operator to establish the call with the called party;

establishing the call with the called party in response to the instructing step;

establishing communication between the local operator and a remote operator over a packet switched network;

communicating with the called party to determine treatment of the call;

exchanging control messages between the remote operator and the local operator based upon the communicating step; and controlling call processing of the call based upon the exchanging step, wherein the remote operator in the step of establishing communication is a foreign language operator.

3. The method according to claim 2, further comprising translating a signaling protocol that is used by the ACD into packet data that is used by the local operator, and vice versa.

4. The method according to claim 2, further comprising communicating with another ACD over a voice network that utilizes a plurality of release link trunks (RLTs).

5. The method according to claim 2, wherein the instructing step indicates that the call is to be charged to the called party.

6. The method according to claim 2, wherein the local operator in the step of instructing is a manual operator console, the manual operator console being controlled by a live operator.

7. The method according to claim 2, wherein the local operator in the step of instructing is automated.

8. The method according to claim 2, wherein the foreign language operator is automated.

9. The method according to claim 2, wherein the foreign language operator is a manual operator console, the manual operator console being controlled by a live operator.

10. The method according to claim 7, wherein the packet switched network in the step of establishing communication utilizes Internet Protocol.

11. The method according to claim 2, wherein the control messages in the exchanging step are intelligent network application programming interface (INAPI) messages.

12. A communication system for processing a call between a calling party and a called party, comprising:
- a bridging switch configured to switch a call offer from the calling party;
- an automatic call distributor (ACD) coupled to the bridging switch and configured to distribute selectively the call offer received from the bridging switch;
- a local operator configured to receive the call offer from the ACD and to establish the call with the called party in response to an instruction by the calling party; and
- a remote operator exchanging control messages with the local operator over a packet switched network to control call processing of the call in response to an input by the called party, the remote operator instructing the local operator to complete the call based upon the input.

13. A communication system for processing a call between a calling party and a called party, comprising:
- a bridging switch configured to switch a call offer from the calling party;
- an automatic call distributor (ACD) coupled to the bridging switch and configured to distribute selectively the call offer received from the bridging switch;
- a local operator configured to receive the call offer from the ACD and to establish the call with the called party in response to an instruction by the calling party; and
- a remote operator exchanging control messages with the local operator over a packet switched network to control call processing of the call in response to an input by the called party, the remote operator instructing the local operator to complete the call based upon the input, wherein the remote operator is a foreign language operator.

14. The system according to claim 13, further comprising an adjunct processor coupled to the ACD and the local operator, the adjunct processor being configured to translate a signaling protocol that is used by the ACD into packet data that is used by the local operator console.

15. The system according to claim 13, further comprising another ACD communicating with the ACD over a voice network that utilizes a plurality of release link trunks (RLTs).

16. The system according to claim 13, wherein the packet switched network utilizes Internet Protocol.

17. The system according to claim 13, wherein the instruction of the calling party indicates that the call is to be charged to the called party.

18. The system according to claim 13, wherein the local operator is a manual operator console, the manual operator console being controlled by a live operator.

19. The system according to claim 13, wherein the local operator is automated.

20. The system according to claim 13, wherein the foreign language operator is a manual operator console, the manual operator console being controlled by a live operator.

21. The system according to claim 13, wherein the foreign language operator is automated.

22. The system according to claim 13, wherein the control messages are intelligent network application programming interface (INAPI) messages.

23. A communication system for processing a collect call, comprising:
- a first bridging switch configured to receive the call offer from a first customer premises equipment (CPE), the call offer requesting setup of a collect call between the first CPE and a second CPE;
- a first automatic call distributor (ACD) coupled to the first bridging switch and configured to distribute selectively the call offer received from the first bridging switch;
- a local operator center configured to receive the call offer from the ACD and to establish the collect call with a called party associated with the second CPE in response to an instruction by a calling party associated with the first CPE;
- a first adjunct processor communicating with the ACD using a first signaling protocol and communicating with the local operator center using a second signaling protocol, the first adjunct processor performing translation between the first signaling protocol and the second signaling protocol, and vice versa;
- a second ACD communicating with the first ACD over a circuit switched network;
- a remote operator center exchanging control messages with the local operator center over a packet switched network to control call processing; and
- a remote operator communicating with the local operator over a packet switched network to control the call, the remote operator controlling the call in response to an input by the called party, and completing the call based upon the input.

24. A communication system for processing a collect call, comprising:
- a first bridging switch configured to receive the call offer from a first customer premises equipment (CPE), the call offer requesting setuip of a collect call between the first CPE and a second CPE;
- a first automatic call distributor (ACD) coupled to the first bridging switch and configured to distribute selectively the call offer received from the first bridging switch;
- a local operator center configured to receive the call offer from the ACD and to establish the collect call with a called party associated with the second CPE in response to an instruction by a calling party associated with the first CPE;
- a first adjunct processor communicating with the ACD using a first signaling protocol and communicating with the local operator center using a second signaling protocol, the first adjunct processor performing translation between the first signaling protocol and the second signaling protocol, and vice versa;

a second ACD communicating with the first ACD over a circuit switched network;

a remote operator center exchanging control messages with the local operator center over a packet switched network to control call processing; and a remote operator communicating with the local operator over a packet switched network to control the call, the remote operator controlling the call in response to an input by the called party, and completing the call based upon the input, wherein the remote operator center comprises a foreign language operator.

25. The system according to claim 24, further comprising a second ACD communicating with the ACD over a voice network that utilizes a plurality of release link trunks (RLTs).

26. The system according to claim 24, wherein the packet switched network utilizes Internet Protocol.

27. The system according to claim 24, wherein the local operator center comprises a manlial operator console and an audio response unit that performs automated operator services.

28. A computer-readable medium carrying one or more sequences of one or more instructions for processing a call between a calling party and a called party, the one or more sequences of one or more instructions including instructions which, when executed by one or more processors, cause the one or more processors to perform the steps of:

establishing communication between a local operator and a remote operator over a packet switched network;

communicating with the called party to determine treatment of the call;

exchanging control messages between the remote operator and the local operator based upon the communicating step; and controlling the call based upon the exchanging step.

29. A computer-readable medium carrying one or more sequences of one or more, instructions for processing a call between a calling party and a called party, the one or more sequences of one or more instructions including instructions which, when executed by one or more processors, cause the one or more processors to perform the steps of:

establishing communication between a local operator and a remote operator over a packet switched network, communicating with the called party to determine treatment of the call;

exchanging control messages between the remote operator and the local operator based upon the communicating step; and controlling the call based upon the exchanging step, wherein the remote operator in the step of establishing communication is a foreign language operator.

30. The computer-readable medium according to claim 29, wherein the foreign language operator is automated.

* * * * *